United States Patent

[11] 3,611,139

[72] Inventor Quintin H. George
Sudbury, Mass.
[21] Appl. No. 14,158
[22] Filed Feb. 25, 1970
[45] Patented Oct. 5, 1971
[73] Assignee The United States of America as represented by the Secretary of the Navy

[54] ORTHOGONAL MIXER $F_1$ $F_1$ REPEATER
5 Claims, 3 Drawing Figs.

[52] U.S. Cl. .......... 325/6, 325/8, 325/9
[51] Int. Cl. .......... H04b 7/20
[50] Field of Search .......... 325/5, 6, 8, 9, 13, 15; 343/7.5, 175

[56] References Cited

UNITED STATES PATENTS

| | | | |
|---|---|---|---|
| 3,341,847 | 9/1967 | Fried | 343/7.5 |
| 3,085,200 | 4/1963 | Goodall | 325/13 |
| 3,007,159 | 10/1961 | Dodington | 325/6 X |
| 3,271,770 | 9/1966 | Lees | 325/8 X |
| 3,300,782 | 1/1967 | Margerum | 325/8 X |

*Primary Examiner*—Robert L. Griffin
*Assistant Examiner*—Kenneth W. Weinstein
*Attorneys*—R. S. Sciascia and Thomas O. Watson, Jr.

ABSTRACT: This device is a repeater and is used to acquire, amplify and retransmit amplitude or frequency modulated radio signals using overlapping transmit-receive bandwidths. In brief, a received signal is acquired, slightly offset, and retransmitted. The retransmitted signal is rejected by the receiver since the retransmitted carrier signal has been shifted in phase by 90°.

INVENTOR.
QUINTIN H. GEORGE
BY Thomas O. Watson Jr.
ATTORNEY

ORTHOGONAL MIXER $F_1$ $F_1$ REPEATER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to radio repeaters and more particularly to a radio repeater which retransmits a received signal at the same frequency but shifted slightly in phase.

Radio repeaters serve a necessary and important function in our present day existence, and form an integral unit in many electronic systems. In long-distance communication networks, for example, they form a basic component in that they receive a transmitted message, amplify this message, and retransmit it on to the next station. Without these units it would often be impossible to receive and understand a message at a distant receiving station.

With the type of transmitters, receivers, or transceivers normally used at the frequencies of the VHF or UHF repeaters of today, the frequency range is generally divided into 50 kc. wide channels. The difference between two carrier frequencies in adjacent channels therefore, is 50 kc. This difference is a variance due to the instability of the equipment oscillators. However, the IF band of the receiver being used permits the reception of a signal anywhere in the 50 kc. band of a particular channel. Previously, to repeat a received signal it was necessary to translate the signal several channels away before retransmitting ($F_1$, $F_2$ repeater). The technique described in the present invention permits translation of the signal only a fraction of a channel, which in effect, means a repeater which receives and retransmits in the same channel (hence, $F_1$, $F_1$).

SUMMARY OF THE INVENTION

The solid state UHF repeater of the present invention is a unit which shall operate at 300 mc. and retransmit a received Am signal with upwards of 100 db. gain (not including antenna gain) within the same 50 kc. channel it is received in. This repeater would significantly extend the range between air to ground or air to air stations (several hundred miles), as well as provide communications beyond line-of-sight.

An analysis of the UHF equipment frequency tolerance indicates that it is normally impractical to retransmit at a constant frequency within an 50 k.c. channel, independent of the received frequency. Furthermore, time-sharing techniques have not been very successful.

The technique demonstrated herein incorporates orthogonal mixing along with hybrid isolation, selective filtering, closed-loop controlled frequency offset and antenna matching, so as to achieve adequate isolation between the received and retransmitted signals.

OBJECTS OF THE INVENTION

An object of the present invention is the provision of an orthogonal mixer radio repeater.

Another object of the present invention is the provision of a radio repeater which will receive and retransmit a signal within a 50 kc. channel.

Still another object of the present invention is the provision of a radio repeater which will retransmit a received signal with upwards of a 100 db. of gain.

Yet another object of the present invention is the provision of a repeater which receives a signal and slightly offsets it before retransmitting.

Still another object of the present invention is the provision of a radio repeater in which the retransmitted carrier signal has been shifted in phase by 90° relative to the received signal.

Yet another object of the present invention is the provision of a radio repeater in which the voltage-controlled oscillator is controlled by a phase-locked loop so that the oscillator will lock onto a frequency which has been shifted a specific amount from the received signal frequency.

Other objects, advantages and novel features of the invention will become apparent from the following detailed description of the invention when considered in conjunction with the accompanying drawings.

DESCRIPTION OF THE PREFERRED EMBODIMENTS

Figure 2:
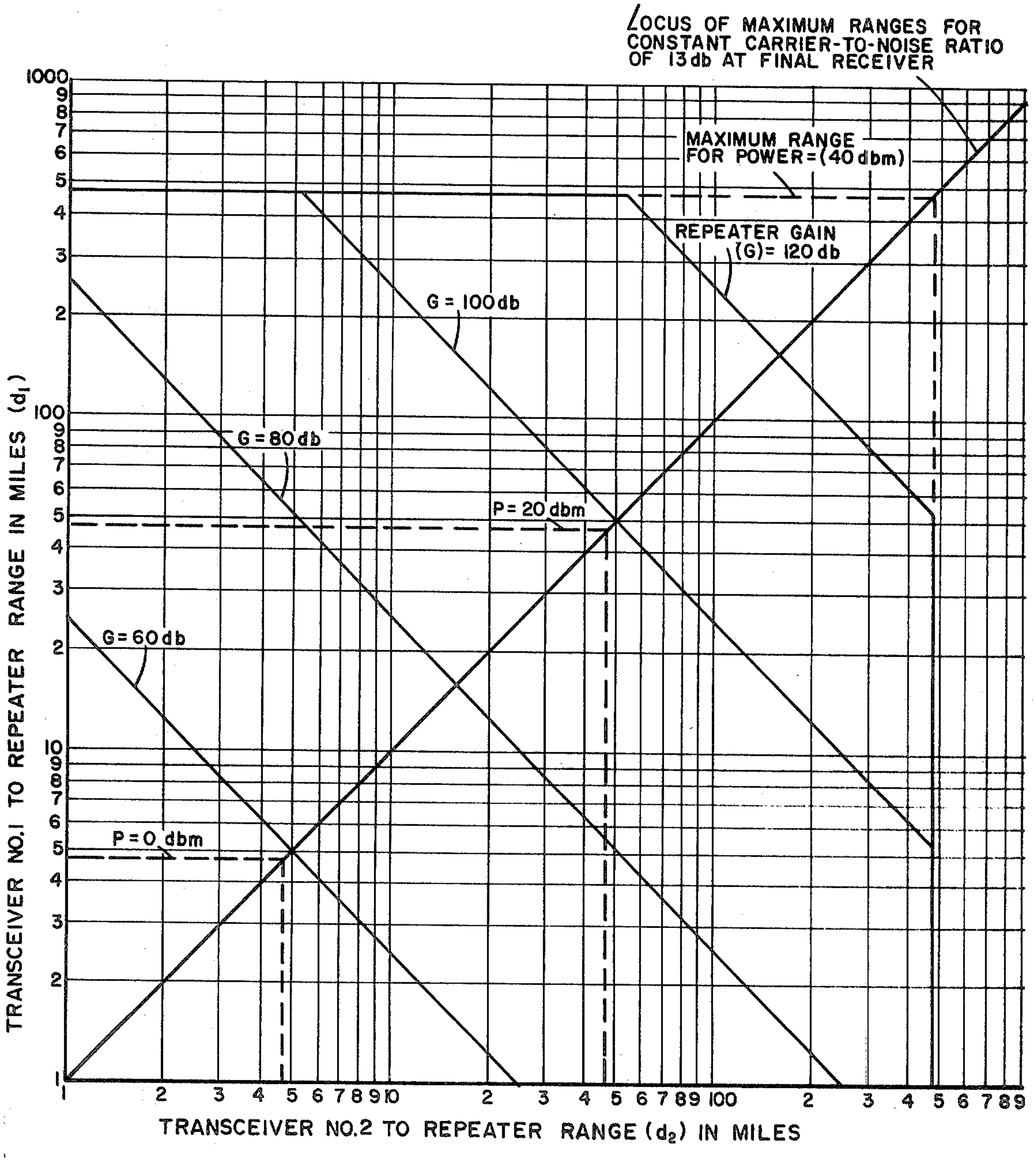
FIG. 2 is a graph showing two-way repeater operating characteristics.

In FIG. 2, the range relationship for the repeaters of 120 db. gain, 100 db. gain, 80 db. gain, and 60 db. gain are shown, line-of-sight conditions being assumed for the paths connecting each transceiver to the repeater, and free space propagation conditions having been considered.

The curves of FIG. 2 represent contours of constant receiver carrier to noise ratio (CNR=13 db.) for several repeater gains; D1 is the distance between the repeater and transceiver No. 1, and D2 is the difference between the repeater and transceiver No. 2. It can be seen from the curve that the maximum repeater range is determined by the peak available transmitter power of the repeater as well as the geometry.

Figure 3:
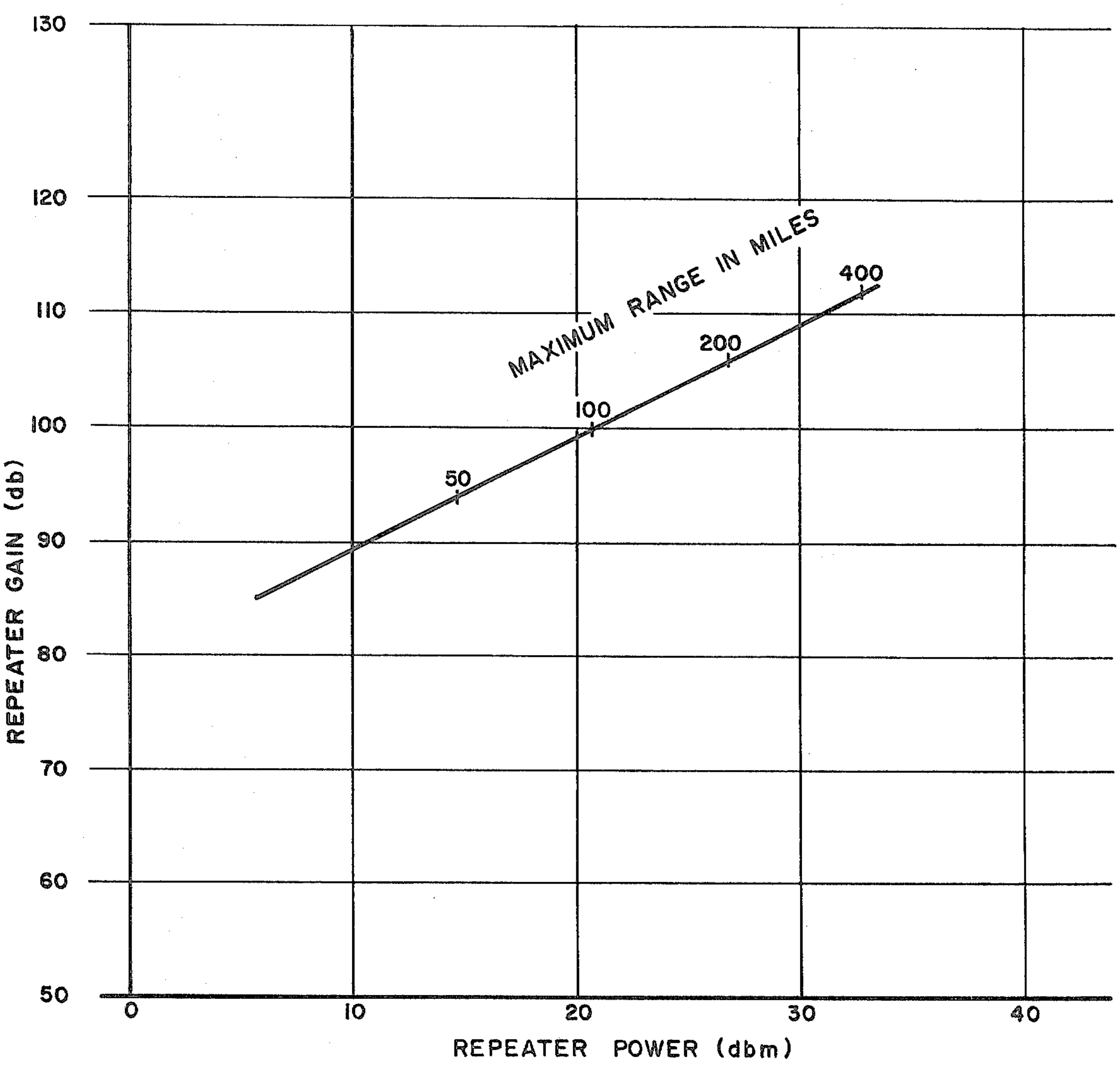
FIG. 3 is a graph in which minimum repeater gain is plotted as a function of repeater output power.

From FIG. 2, it can be seen that for any given maximum available repeater output power, there corresponds a minimum repeater gain which will provide a satisfactory communication capability between two terminals, each spaced anywhere within the maximum repeater range established by the maximum available repeater output power. Thus, this gain will maximize the repeater range capability. This minimum repeater gain is plotted in FIG. 3 as a function of the repeater output power with the corresponding maximum total repeater communication range (D1+D2) between the two terminals also shown. Lower repeater gains could, of course, be used if one of the terminals is relatively close to the repeater.

Figure 1:
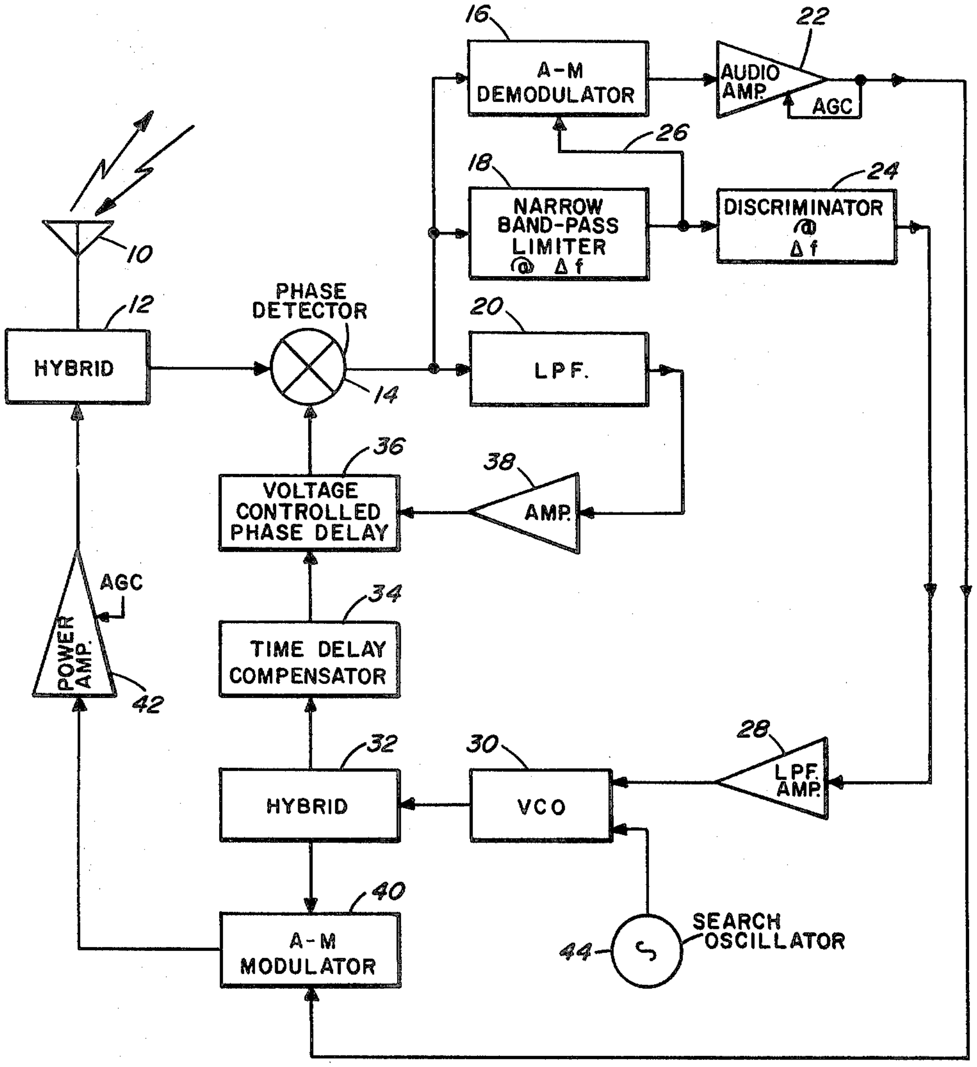
FIG. 1 shows a schematic diagram of a repeater for AM signals.

Turning now to FIG. 1 there is shown an antenna 10 which serves as both a receiving and transmitting antenna. Antenna 10 is connected to a hybrid junction 12, such as a magic T or the like, which acts as an isolation component in that a signal received on the antenna will find a low-resistance path to the phase detector 14 and a high-resistance path to the transmitter, while at the same time offering a low-resistance path to the antenna itself and a high-resistance path to the receiver as in the case of the rebroadcast signal. The signal from hybrid connection 12 is then led to phase detector 14 where the signal is detected and shifted slightly as will be described more fully hereinafter. Controlling the frequency at which the repeater operates there is a voltage-controlled oscillator 30 whose output feeds into a power divider 32. One output of power divider 32 feeds to a time delay compensator 34 which in turn goes to a voltage-control phase delay 36, this delay in turn forming one input to phase detector 14.

Connected to the output of phase detector 14 there is a low-pass filter 20, this in turn being connected to an amplifier 38 the amplifier connecting as an input to voltage-control phase delay 36 and serving as a stabilizing feedback circuit. Also connected to the output of phase detector 14 there is a narrow band pass limiter 18 followed by a discriminator 24 these in turn being followed by a low-response frequency amplifier 28 whose output forms an input to voltage-control oscillator 30. Limiter 18, discriminator 24 and amplifier 28 are joined together to form a phase-locked loop between the detector and the oscillator and this loop serves as a means of locking the oscillator frequency to a desired amount as will be described hereinafter.

A third channel from the output of phase detector 14 is formed by an AM demodulator 16 followed by an audio-amplifier 22 whose output is connected to the input of an AM modulator 40. A lead 26 joins the junction point of narrow band pass limiter 18 and discriminator 24 with demodulator 16.

A second output from power divider 32 supplies a signal to modulator 40 to form the retransmitted shifted signal, this signal being applied to a power amplifier 42, to the hybrid junction 12 and in turn to antenna 10 for rebroadcasting. A search oscillator 44 is connected to a voltage-controlled oscillator 30 so that the latter oscillator is slowly frequency scanned.

Turning now to the operation of the invention it will be seen that the repeater transmitter operating frequency is derived directly from a voltage-controlled oscillator 30, which is an integral part of a phase-locked loop. The frequency of the VCO is originally tuned to, or near, the operating channel center frequency and is slowly frequency scanned by search oscillator 44, so as to search for the exact frequency setting. When an AM signal is received on antenna 10 it is applied through hybrid junction 12 to the input of phase detector 14 which uses a delayed VCO output, as caused by time delay compensator 34 and voltage-control phase delay 36, for its local oscillator. Hence, the phase detector output consists of an AM carrier signal shifted to a frequency equal to the difference between the received signal and the VCO signal. This signal is filtered by narrow band pass limiter 18, limited to remove the AM, and then passed through a frequency discriminator 24 centered at frequency delta F, the desired frequency shift. The signal from discriminator 24 is then applied through amplifier 28 to the VCO so as to force the VCO to lock onto that frequency, which is exactly delta F cycles per second away from the receiving frequency.

The VCO signal is applied to a power divider 32 with two outputs, one of the outputs being applied to AM modulator 40. From the output of the phase detector 14, the AM signal to be retransmitted is filtered by narrow band pass filter 18 so as to provide additional selectivity and is then translated via lead 26 to demodulator 16 from whence it passes through amplifier 22 and applied to modulator 40 where it is used as the modulating signal for this modulator as mentioned above. Immediately following the AM modulator 40 is a power amplifier 42 whose output constitutes the transmitter signal, a replica of the received signal, but shifted delta F cycles per second. This signal then passes through the hybrid 12 (which provides isolation between the transmitter and the receiver sections of the repeater), and then is directed to the antenna 10 for transmission.

Antenna reflection and imperfect hybrid isolation give rise to a strong transmitter signal interfering with the reception of the desired signal. To provide suppression of this leakage signal and thus guarantee satisfactory repeater operation, voltage-controlled delay 36 is inserted between the VCO power divider 32 output and the input to the phase detector 14. The delay is realized through a fixed network 34 and a voltage-variable network 36. The fixed time delay network 34 is used to closely compensate for the fixed group delay experienced by the leakage signals through its path to the phase detector. The voltage-control phase delay 36 provides 90° phase difference between the VCO signal and the leakage signal so that the leakage signal contribution at the output of the phase detector 14 is ideally eliminated.

Inaccuracies in the group delay compensation, however, will cause imperfect cancellation of this signal. For this reason, the phase delay network is voltage controlled via a feedback loop (narrow band pass filter 18, discriminator 24, and amplifier 28) with an active narrow band pass filter 18 which tends to correct for these inaccuracies and this minimize their effect.

The use of a hybrid 12 at the antenna will provide a high degree of isolation (typically about 40 db.) between the transmitted and the received signals. In practice, however, this isolation is degraded by the antenna-hybrid impedance mismatch which gives rise to a strong reflected signal leakage in the receiver. A practical design goal would be to keep this antenna reflection down 30 db. below the transmitter power level.

Following the hybrid receiver port 12, the received signal and the transmitter leakage signal are applied to a mixer 14 which uses a replica of the transmitted signal carrier as the local oscillator. Prior to mixing, this local oscillator is passed through a group delay compensation network 34, 36 which ideally provides a 90° phase difference between the local oscillator and the leakage signal carrier (both at the same frequency) at the nominal center frequency. Upon mixing, the leakage signal is ideally suppressed, while the signal to be repeated is shifted down to about 8 kc. (the frequency difference between the received and transmitted signals).

Since the repeater must be capable of transmitting anywhere within the 50 kc. channel, then the compensation network must be able to provide the degree of orthogonal mixing required to yield the desired strong signal suppression over this bandwidth.

If the compensation network is matched to yield 90° phase difference at 300 mc. (the center frequency), and further assuming that the leakage signal suffers a group delay of 0.5 microseconds, but that we can compensate for this time delay with a 5 percent accuracy, then the group delay difference between the local oscillator and the leakage signal carrier will be $T=0.5\times5$ percent which equals 25 nanoseconds. If the received signal is at a frequency which requires the repeater to transmit (worst case) at a frequency of $\times20$ kc. from center frequency, then the differential group delay will produce a differential phase shift (from 90°) of $D=2(20\times10^3)(25\times10^9)$ or $D=0.0032$ radians or 0.18°. This phase error would result in an "open loop" leakage-signal suppression of about 50 db. With the aid of the feedback loop to correct for this phase difference, additional suppression is realized. This added suppression increases proportionally with the square of the loop gain; that is, if the loop gain is 100, a theoretical increase of 40 db. in strong signal suppression is achieved. For this additional level of suppression, the loop must be designed with a low-pass (RC) filter of time constant about 0.2 seconds to assure that the loop will only respond to the carrier and not the AM sidebands which extend down to 300 c.p.s. It appears that 50 db. of strong signal rejection can be conservatively achieved with this technique.

The introduction of a band pass filter (centered at a frequency equal to the desired translation, that is 8 kc.) at the output of the mixer, and prior to the demodulation and "limiting" of the received signal, will further enhance the rejection of the interferring leakage signal. The desired weak AM signal will ultimately appear centered at 8 kc. with the side bands nominally extending from 5 to 11 kc. The leakage signal and its sidebands will fall in the band of DC to 3 k.c.

If a 5 pole Butterworth filter with a 0.5 db. bandwidth of 6 kc. centered at 7.5 kc. is used, it will have an antennation of 40 db. or more in the band of 0. to 3 k.c. and should thus suppress the undesired signal by at least that amount.

Based on the discussions above it appears feasible that the repeater can provide a combined total receiver-transmitter isolation of;

| | |
|---|---|
| Hybrid and Antenna Match | 30 db. |
| Orthogonal Mixing Loop | 50 db. |
| Band Pass Filtering | 40 db. |
| Combined Total Isolation | 120 db. |

From the above description of the structure and operation of the invention it is obvious that there is presented herein an orthogonal mixer radio repeater which acquires an incoming signal, amplifies it, shifts it slightly in phase, and then retransmits it. The retransmitted signal has been shifted 90° in phase but is rebroadcast at the same frequency as the incoming signal, use being made of hybrid isolators, antenna match and selective filtering to eliminate interference between the broadcast and receive signals.

Obviously many modifications and variations of the present invention are possible in the light of the above teachings.

What is claimed is:

1. A repeater transmitting comprising:
- an antenna for receiving the signal to be retransmitted;
- a phase detector having one input connected to the antenna;
- an oscillator connected to the phase detector;
- said phase detector having a second input consisting of a voltage-controlled phase delay circuit for delaying the output from the oscillator such that the phase detector output consists of a received signal shifted to a frequency equal to the difference between the received signal and the oscillator signal;
- a phase-locked loop between the output of the phase detector and the oscillator to determine the frequency at which the oscillator operates;
- means connected to the output of the oscillator for transmitting the signal; and
- isolation means connected between the transmitting means and the antenna for separating the received and transmitted signals.

2. The device of claim 1 wherein there is a feedback circuit between the phase detector and the delay circuit consisting of a low-pass filter and an amplifier.

3. The device of claim 2 further including:
- a power divider connected to the output of the oscillator;
- a modulator connected to the output of the power divider; and
- a time delay compensator connected to another output of the power divider.

4. The device of claim 3 wherein the phase-locked loop comprises:
- a narrow band pass filter connected to the output of the phase detector to pass the shifted frequency output of the phase detector;
- a discriminator connected to the narrow band pass filter; and
- a low-band pass filter amplifier connected to the discriminator, the output of the amplifier feeding the oscillator to lock onto a frequency which is the same as the shifted frequency output of the phase detector.

5. The device of claim 4 further including:
- a demodulator connected to the output of the phase detector;
- an audio-amplifier connected to the output of the demodulator;
- means connecting the audio amplifier and the modulator;
- a power amplifier connected to the output of the modulator; and
- means connecting the output of the power amplifier and the isolation means to direct the signal to the antenna for transmission.